US012803230B2

(12) United States Patent
Kanno et al.

(10) Patent No.: US 12,803,230 B2
(45) Date of Patent: Nov. 17, 2026

(54) ELECTRICAL DEVICE

(71) Applicant: Koki Holdings Co., Ltd., Tokyo (JP)

(72) Inventors: Shota Kanno, Ibaraki (JP); Tomotaka Harano, Ibaraki (JP); Yusuke Funabiki, Ibaraki (JP); Naoto Wakatabe, Ibaraki (JP); Hiroyuki Oda, Ibaraki (JP); Shinji Watanabe, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 765 days.

(21) Appl. No.: 18/031,875

(22) PCT Filed: Oct. 8, 2021

(86) PCT No.: PCT/JP2021/037330
§ 371 (c)(1),
(2) Date: Apr. 13, 2023

(87) PCT Pub. No.: WO2022/080252
PCT Pub. Date: Apr. 21, 2022

(65) Prior Publication Data

US 2025/0087949 A1 Mar. 13, 2025

(30) Foreign Application Priority Data

Oct. 16, 2020 (JP) ................................ 2020-174984

(51) Int. Cl.
*H01R 13/68* (2011.01)
*B25F 5/02* (2006.01)
(Continued)

(52) U.S. Cl.
CPC ............... *H01R 13/68* (2013.01); *B25F 5/02* (2013.01); *H01H 85/0241* (2013.01);
(Continued)

(58) Field of Classification Search
CPC . H01R 13/68; H01R 13/7036; H01M 50/247; H01M 50/51; H01M 50/204;
(Continued)

(56) References Cited

U.S. PATENT DOCUMENTS 5,898,357 A * 4/1999 Endo ...................... H01H 85/11 337/159
6,296,065 B1 * 10/2001 Carrier ...................... B25F 5/02 173/171
(Continued)

FOREIGN PATENT DOCUMENTS

CN 101637896 2/2010
CN 107004825 8/2017
(Continued)

OTHER PUBLICATIONS

"The First Office Action of China Counterpart Application", issued on Dec. 30, 2025, with English translation thereof, p. 1-p. 17.
(Continued)

*Primary Examiner* — Dariush Seif
(74) *Attorney, Agent, or Firm* — JCIPRNET

(57) ABSTRACT

A terminal holding part 30 is provided in a battery pack mounting section of the electrical device. The terminal holding part 30 has a machine-side first positive electrode terminal 32, a machine-side second positive electrode terminal 33, a machine-side first negative electrode terminal 34, a machine-side second negative electrode terminal 35, and machine-side signal terminals 36. A fuse unit 40 is detachable from the terminal 32 and terminal 34. The fuse unit 40 includes: a fuse 41 connected between the terminal 32 and the terminal 34; a first conductor 49, one end of which is connected to one end of the fuse 41, and the other end of which is detachably connected to the terminal 32; and a second conductor 50, one end of which is connected to the
(Continued)

other end of the fuse 41, and the other end of which is detachably connected to the terminal 34.

17 Claims, 9 Drawing Sheets

(51) Int. Cl.

| | |
|---|---|
| ***H01H 85/02*** | (2006.01) |
| ***H01H 85/18*** | (2006.01) |
| ***H01M 50/204*** | (2021.01) |
| ***H01M 50/247*** | (2021.01) |
| ***H01M 50/51*** | (2021.01) |
| ***H01M 50/583*** | (2021.01) |
| ***H01R 13/703*** | (2006.01) |

(52) U.S. Cl.
CPC ........ *H01H 85/185* (2013.01); *H01M 50/204* (2021.01); *H01M 50/247* (2021.01); *H01M 50/51* (2021.01); *H01M 50/583* (2021.01); *H01R 13/7036* (2013.01); *H01H 2085/025* (2013.01); *H01M 2200/103* (2013.01); *H01M 2220/30* (2013.01)

(58) Field of Classification Search
CPC ......... H01M 50/583; H01M 2200/103; H01M 2220/30; B25F 5/02; H01H 85/0241; H01H 85/185; H01H 2085/025
See application file for complete search history.

(56) References Cited

U.S. PATENT DOCUMENTS

| | | | | |
|---|---|---|---|---|
| 6,350,149 | B1 * | 2/2002 | Nakane ................ | H01R 13/113 439/500 |
| 9,011,180 | B2 * | 4/2015 | Sharaf .................. | H01R 13/684 439/620.3 |
| 10,158,204 | B2 * | 12/2018 | Okazaki ................ | B60L 3/0084 |
| 2006/0091858 | A1 * | 5/2006 | Johnson .................... | B25F 5/00 320/128 |
| 2008/0192399 | A1 | 8/2008 | Chen | |
| 2009/0246611 | A1 * | 10/2009 | Kim .................... | H01M 50/147 174/260 |
| 2010/0029139 | A1 * | 2/2010 | Tomita ...................... | B25F 5/02 439/668 |
| 2010/0108341 | A1 * | 5/2010 | Casalena ................... | H02J 7/70 173/217 |
| 2014/0302353 | A1 * | 10/2014 | Ogura ................. | H01M 50/572 429/7 |
| 2015/0017507 | A1 * | 1/2015 | Yang ................... | H01M 50/524 429/121 |
| 2015/0130584 | A1 | 5/2015 | Totsuka et al. | |
| 2016/0240901 | A1 * | 8/2016 | Kondo .............. | H01M 10/6235 |
| 2016/0241065 | A1 * | 8/2016 | Kondo ................ | H01M 50/213 |
| 2019/0044110 | A1 * | 2/2019 | Sheeks ................... | H02K 11/33 |
| 2019/0259984 | A1 * | 8/2019 | Nishikawa .......... | H01M 50/247 |
| 2019/0259985 | A1 * | 8/2019 | Hanawa .............. | H01M 50/213 |
| 2019/0280501 | A1 * | 9/2019 | Kondo ................ | H01M 10/425 |
| 2020/0006883 | A1 * | 1/2020 | Tirlea ................... | H02H 7/1227 |
| 2020/0161609 | A1 * | 5/2020 | Murakami .......... | H01M 50/213 |
| 2020/0212688 | A1 * | 7/2020 | Aoki ................... | H01M 10/425 |
| 2022/0223949 | A1 * | 7/2022 | Masumori ........... | H01M 50/213 |
| 2024/0055674 | A1 * | 2/2024 | Nishikawa .......... | H01M 50/296 |
| 2024/0421446 | A1 * | 12/2024 | Yang ................... | H01M 50/533 |
| 2025/0087949 | A1 * | 3/2025 | Kanno ................ | H01M 50/583 |
| 2025/0183386 | A1 * | 6/2025 | Kim .................. | H01M 10/4264 |

FOREIGN PATENT DOCUMENTS

| | | |
|---|---|---|
| CN | 110832669 | 2/2020 |
| JP | 65878739 | 5/1983 |
| JP | 2011140108 | 7/2011 |
| JP | 2013230553 | 11/2013 |
| JP | 2019021594 | 2/2019 |

OTHER PUBLICATIONS

"Search Report of Europe Counterpart Application", issued on Aug. 21, 2023, p. 1-p. 8.
"International Search Report (Form PCT/ISA/210) of PCT/JP2021/037330", mailed on Nov. 30, 2021, with English translation thereof, pp. 1-4.
"Office Action of China Counterpart Application", issued on Jul. 21, 2026, with English translation thereof, pp. 1-12.

* cited by examiner

ELECTRICAL DEVICE

CROSS-REFERENCE TO RELATED APPLICATION

This application is a 371 application of the International PCT application serial no. PCT/JP2021/037330, filed on Oct. 8, 2021, which claims the priority benefits of Japan Patent Application No. 2020-174984, filed on Oct. 16, 2020. The entirety of each of the above-mentioned patent applications is hereby incorporated by reference herein and made a part of this specification.

TECHNICAL FIELD

The invention relates to an electrical device.

RELATED ART

With the spread of battery packs capable of outputting a high voltage and the increasing output of motors, a large current flows in an electrical device such as an electrical tool. Therefore, for example, there is an increasing possibility that a large current that causes malfunctions in the electrical device may flow in the case where an abnormality such as an abnormality in a motor or a malfunction of a controller. Patent Document 1 indicated below discloses an electrical tool in which a fuse is provided on a current path connected to an electrical motor from an AC power source.

CITATION LIST

Patent Literature

[Patent Document 1] Japanese Laid-open No. S58-78739

SUMMARY OF INVENTION

Technical Problem

An element that cuts off the current due to its own deformation or damages, such as a fuse, may raise the concern that element replacement is complicated (Issue 1). In addition, if the fuse connection is insufficient, there may be a concern that the fuse connection is insufficient because of posture variation or vibration that comes along through use of the electrical device (Issue 2). In addition, in the case where a control member, such as a fuse, is newly assembled, there is a risk that the deterioration of the internal configuration through time may be facilitated, and the wiring may be complicated and the assembling may be difficult, in addition to the squeezed accommodation space of the housing (Issue 3).

An objective of the invention is to solve at least one of Issues 1 to 3.

Solution to Problem

An aspect of the invention relates to an electrical device. The electrical device includes: an operation part, operated by electrical power; a body part, accommodating the operation part; a battery pack mounting part, connected with the body part and being able to mount a battery pack for supplying electrical power to the operation part; a terminal holding part, provided at the battery pack mounting part and having a plurality of terminals connectible with the battery pack; and a fuse unit, configured to be detachable to a first positive electrode terminal and a first negative electrode terminal forming the terminals, and including: a fuse, connected between the first positive electrode terminal and the first negative electrode terminal; a first conductor part, one end of the first conductor part being connected to an end of the fuse and an other end of the first conductor part being detachably connected to the first positive electrode terminal; and a second conductor part, one end of the second conductor part being connected to an other end of the fuse and an other end of the second conductor part being detachably connected to the first negative electrode terminal. According to the aspect, in the case where the fuse unit is blown, the electrical device can be used again by removing the fuse unit from the terminal holding part and mounting a new fuse unit to the terminal holding part. Accordingly, an electrical device whose maintenance is easy can be provided.

It may also be that, in a state in which the battery pack is mounted to the battery pack mounting part, the first positive electrode terminal and the first negative electrode terminal are configured to function as a portion of a power supply path for supplying the electrical power from the battery pack to the operation part.

It may also be that the power supply path has: a first power supply path connected with a positive electrode terminal and a negative electrode terminal of the battery pack; and a second power supply path different from the first power supply path. In a state in which the battery pack is not mounted to the battery pack mounting part, the first power supply path and the second power supply path may be configured in a disconnected state in which the first power supply path and the second power supply path are not connected with each other, and in the state in which the battery pack is mounted to the battery pack mounting part, the first power supply path and the second power supply path may be configured in a serially connected state in which the first power supply path and the second power supply path are connected in series with each other. The fuse unit may be provided on the second power supply path. Accordingly, since the fuse unit is provided on the second power supply path different from the first power supply path connected with the positive electrode terminal and the second negative electrode terminal of the battery pack, compared with the case where the fuse unit is provided on the first power supply path, the configuration of the first power supply path can be compact.

The other end of the first conductor part may be connected in a state of being fit with the first positive electrode terminal, and the other end of the second conductor part may be connected in a state of being fit with the first negative electrode terminal. Accordingly, for example, compared with a configuration of being connected through soldering only, a configuration that is strong against impacts such as vibrations, and is replaced easily can be formed.

The battery pack mounting part may be configured to move the battery pack forward toward the battery pack mounting part and mount the battery pack. The terminal holding part may have: a front surface part located at a rear part of the terminal holding part and being opposite to the battery pack; and a back surface part located on a side opposite to the front surface part. The fuse unit may be disposed on the back surface part of the terminal holding part. Accordingly, the fuse unit can be disposed by using the surplus space that is the back surface part of the terminal holding part. Accordingly, a compact electrical device can be provided.

Another aspect of the invention relates to an electrical device. The electrical device includes: an operation part, operated by electrical power; a body part, accommodating the operation part; a battery pack mounting part, connected with the body part and being able to mount a battery pack for supplying electrical power to the operation part; a terminal holding part, provided at the battery pack mounting part and having a plurality of terminals connectible with the battery pack; and a fuse unit, connected with a first positive electrode terminal and a first negative electrode terminal forming the terminals, and including: a fuse, connected between the first positive electrode terminal and the first negative electrode terminal; a first conductor part, one end of the first conductor part being connected to an end of the fuse and an other end of the first conductor part being detachably connected to the first positive electrode terminal; and a second conductor part, one end of the second conductor part being connected to an other end of the fuse and an other end of the second conductor part being detachably connected to the first negative electrode terminal. The battery pack mounting part may be configured to move the battery pack forward toward the battery pack mounting part and mount the battery pack. The terminal holding part may have: a front surface part located at a rear part of the terminal holding part and being opposite to the battery pack; and a back surface part located on a side opposite to the front surface part. The fuse unit may be disposed on the back surface part of the terminal holding part. According to the aspect, by utilizing the region on the side of the back surface part of the terminal holding part, a compact configuration can be achieved. In addition, the wiring to the fuse can be shortened.

The fuse may be covered by an insulating material and disposed in a region within a width dimension of the terminal holding part. The terminal holding part may have an input terminal group into which the electrical power is input from the battery pack, and the fuse may be disposed at a position overlapped with the input terminal group in a width direction. Accordingly, the fuse can be contained (configured to be overlapped with the terminals) in the width dimension, and a compact configuration can be realized. Although the size is increased as the dust resistance is enhanced by insulating coating, compactness can still be maintained by disposing the fuse to the side of the back surface part.

The fuse unit may be further provided with a substrate holding the fuse, the first conductor part, and the second conductor part, and the substrate is fixed to the back surface part of the terminal holding part. Accordingly, the assembling is simplified by unitizing fixing.

The fuse unit may be disposed outside the body part and the battery pack mounting part. Accordingly, the accommodation space of the body part and the battery pack mounting part is reduced, and the size of the body can be reduced.

The fuse unit may be disposed in a region formed between an outer surface of the terminal holding part and an outer surface of the battery pack mounting part. Accordingly, the fuse unit is sandwiched by two components and forms a protected position relationship.

The terminal holding part may be further provided with a holder part made of resin and holding the terminals. An extension part extending in a predetermined direction from the holder part may be provided in the holder part, and the fuse may be disposed in a region covered by the extension part. Accordingly, the fuse can be protected by the extension part.

The battery pack may have at least two cell units, and the second power supply path may be configured to serially connect the two cell units with each other. Accordingly, the two cell units can be protected by using one fuse.

The fuse unit, the first positive electrode terminal, and the first negative electrode terminal may be fixed to each other through an operation with respect to engagement parts formed at the first conductor part and the second conductor part or a fixing means whose fixing force is attenuated by using heat of a predetermined amount or more. Accordingly, the fuse unit can be replaced.

Another aspect of the invention relates to an electrical device. The electrical device includes: an operation part, operated by electrical power; a housing, accommodating the operation part; a control member, controlling an operation of the operation part and held outside the housing. According to the aspect, the control member does not squeeze the accommodation space of the housing, and a compact configuration can be realized. A dead space outside the housing can also be utilized.

The control member may also be an electrical element able to cut off a current. The electrical element may also be a fuse. The electrical element may be connected, fixed to the terminal holding part. In addition, a battery pack, as the source of the electrical power, may be configured to be connectible with the housing. In addition, a battery pack mounting part may be provided at the housing, and the battery pack is detachable to the battery pack mounting part. In addition, the electrical element may be configured to be covered by a terminal holding part provided at the battery pack mounting part or the battery pack.

Any combination of the above components, and the conversion of the mode of the invention between a method and a system are also valid as the embodiments of the invention.

Effects of Invention

According to the invention, it is possible to solve at least one of Issues 1 to 3.

DESCRIPTION OF EMBODIMENTS

Figure 1:
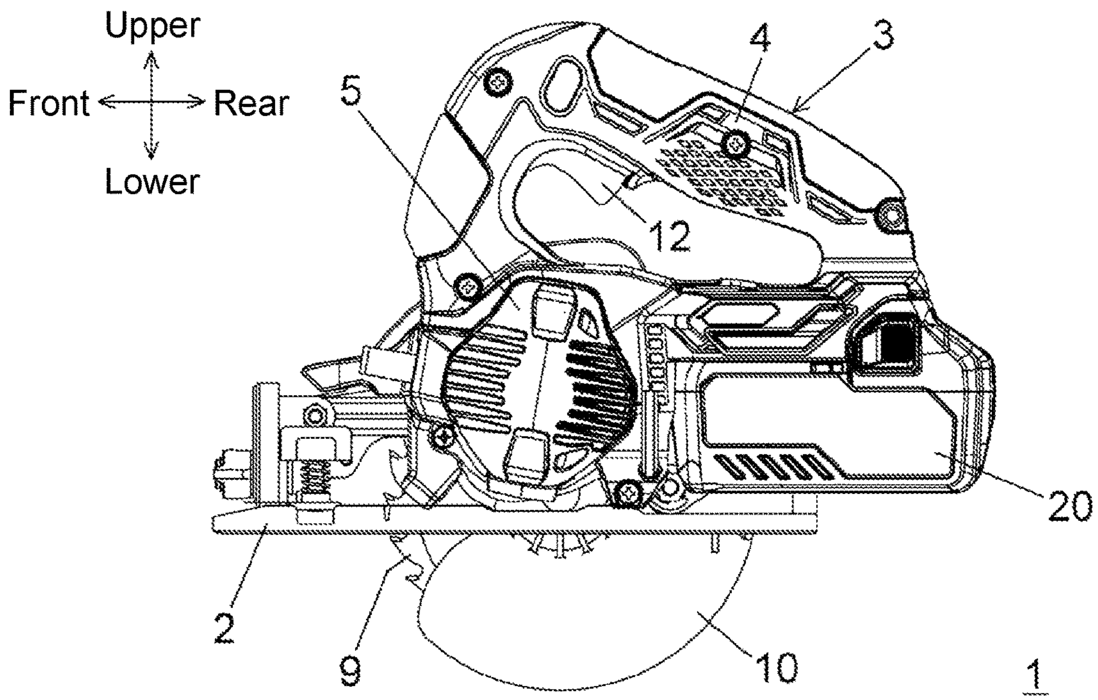
FIG. 1 is a side view illustrating an electrical device 1 according to Embodiment 1 of the invention.

Hereinafter, the same or equivalent components, members, etc., as shown in each drawing are denoted by the same reference numerals, and duplication of description will be omitted as appropriate. The embodiments merely serve as examples and do not serve to limit the invention. All the features and combinations thereof described in the embodiments are not necessarily essential to the invention.

Figure 2:
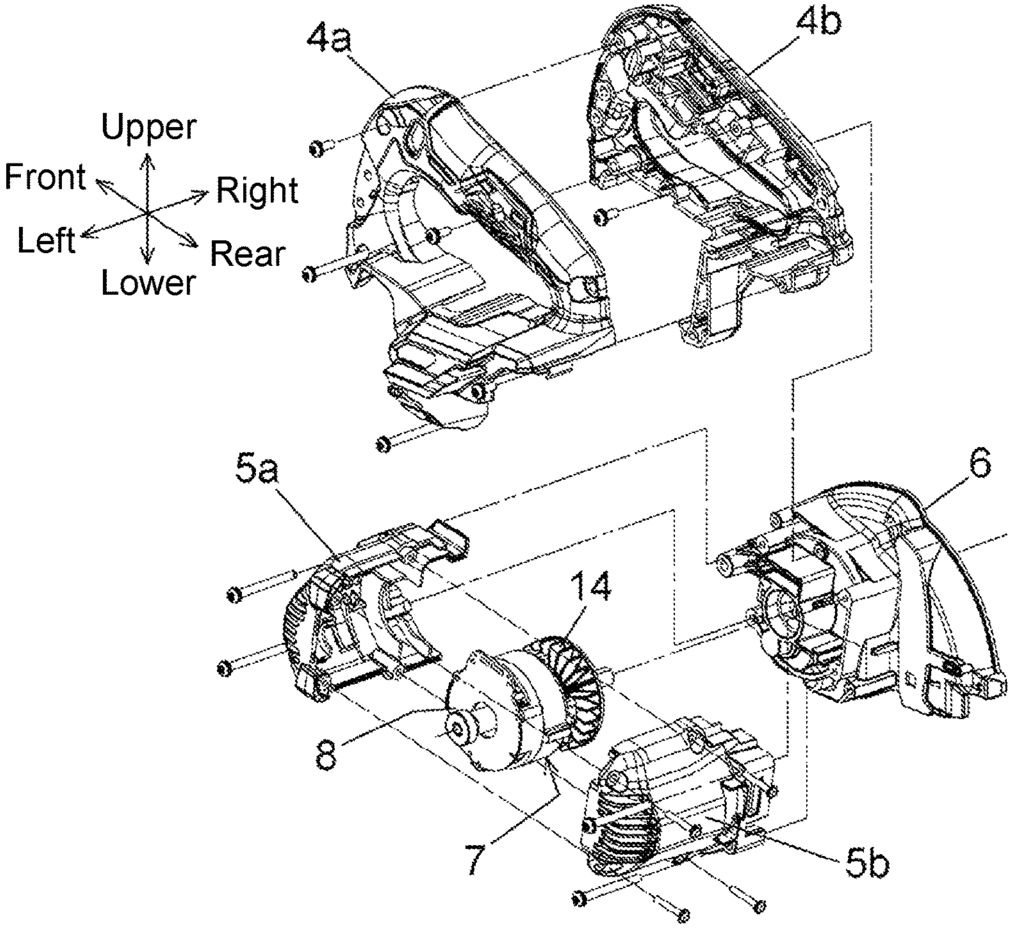
FIG. 2 is an exploded perspective view illustrating a process of assembling a housing 3 of the electrical device 1.
Figure 3:
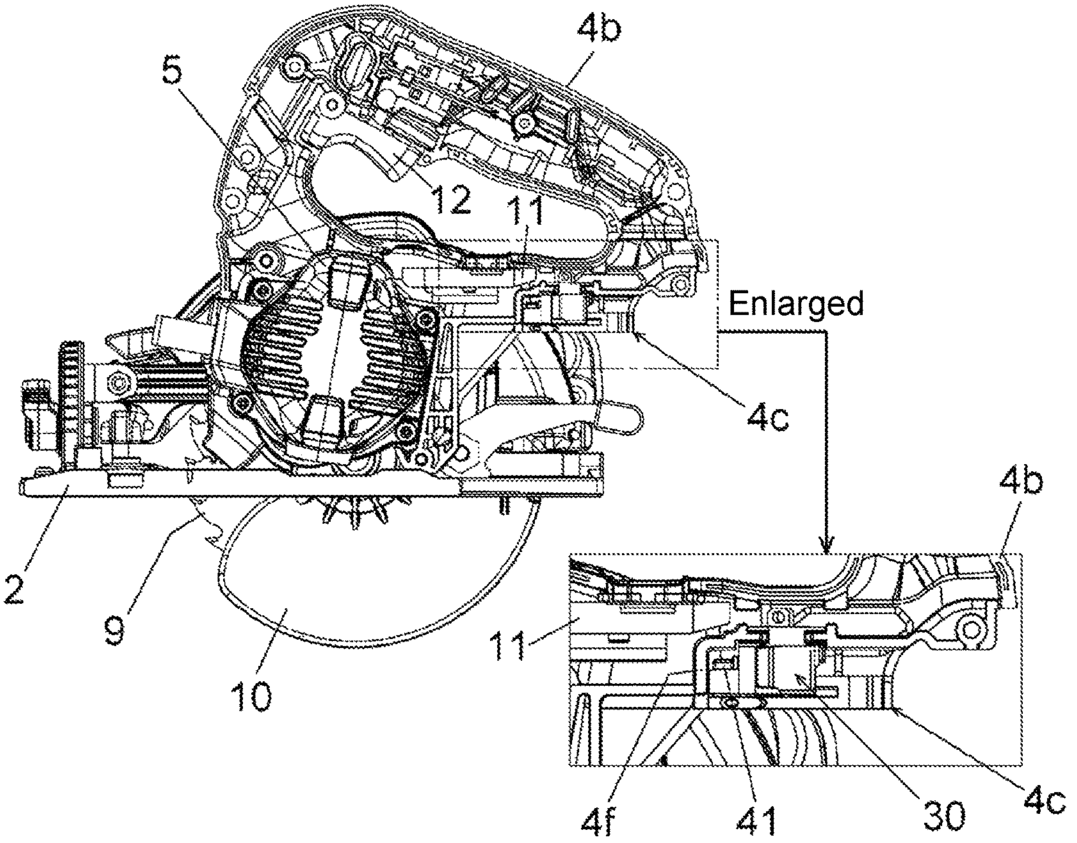
FIG. 3 is a side view of the electrical device 1 in which a left handle housing 4*a* and a battery pack 20 are excluded.
Figure 4:
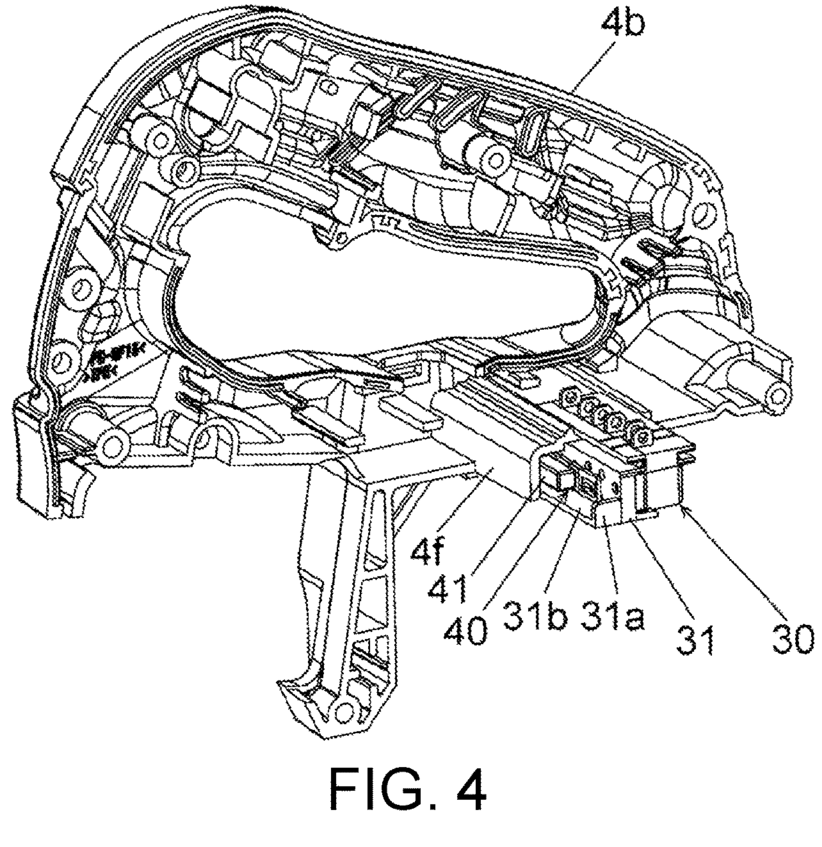
FIG. 4 is a perspective view illustrating a state in which a right handle housing 4*b* and a terminal holding part 30 of the electrical device 1 are assembled.

(Embodiment 1) Embodiment 1 of the invention is described with reference to FIGS. 1 to 12. The embodiment relates to an electrical device 1. The electrical device 1 is a cordless electrical tool, specifically a portable circular saw (portable cutting machine). As shown in FIGS. 1 and 2, the respective directions, i.e., the front-rear, upper-lower, and left-right directions, orthogonal to each other in the electrical device 1 are defined. The front-rear direction is a slide direction when a battery pack 20 is mounted/detached with respect to the electrical device 1.

As shown in FIG. 1, the electrical device 1 includes a base 2 and a housing 3. The bottom surface of the base 2 is a sliding surface with a cut material (processed material). The housing 3 is linked with the base 2 and located above the base 2. The housing 3 includes a handle housing 4, a motor housing 5 as a body part, and a gear case (saw cover) 6 assembled to each other to be integrated. The handle housing 4 and the motor housing 5 are, for example, resin molded bodies. The gear case 6 is made by metal, such as aluminum, for example. A trigger switch 12 is provided at the handle housing 4. The trigger switch 12 is an operation part for the operator to instruct a motor 7 to drive or stop.

As shown in FIG. 2, the handle housing 4 is a component integrated by assembling a left handle housing 4*a* and a right handle housing 4*b* to each other through screwing, etc. As shown in FIG. 2, the motor housing 5 is a component integrated by assembling a front motor housing 5*a* and a rear motor housing 5*b* through screwing, etc. The handle housing 4 and the motor housing 5 are fixed by being screwed to the gear case 6, for example, to be integrated. The gear case 6 is linked with the base 2, and is swingable in the upper-lower direction with respect to the base 20 and tiltable in at least one orientation of the left-right direction, as conventionally known.

As shown in FIG. 2, the motor 7, an inverter-sensor substrate 8, and a fan 14 are accommodated in the motor housing 5. The motor 7 is a brushless motor. The inverter-sensor substrate 8 is provided on the left of the motor 7. In the inverter-sensor substrate 8, an inverter circuit supplying a driving current to the motor 7 and a magnetic sensor, such as a Hall IC, detecting the rotation position of the motor 7 are mounted. The fan 14 is provided on the right of the motor 7, rotates integrally with the motor 7, and generates a cooling wind in a centrifugal direction. The gear case 6 accommodates a deceleration mechanism not shown herein. The deceleration mechanism decelerates the rotation of the motor 7 and transmits the rotation to a saw blade 9 shown in FIG. 1. The saw blade 9 protrudes toward the bottom of the base 2. The majority of the portion protruding to the bottom of the base 2 in the outer circumference of the saw blade 9 is covered by a rotation-type protective cover 10.

Figure 5:
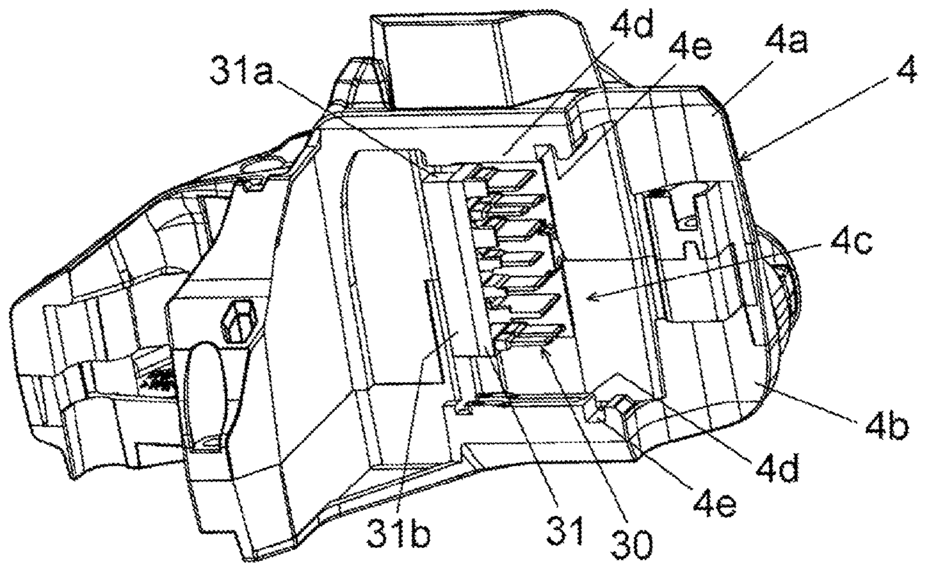
FIG. 5 is a perspective view when viewed from a lower side of the left handle housing 4*a* and the right handle housing 4*b* and the terminal holding part 30 held by the left handle housing 4*a* and the right handle housing 4*b*.

As shown in FIG. 5, the rear lower part of the handle housing 4 serves as a battery pack mounting part 4*c*. A terminal holding part 30 is provided at the battery pack mounting part 4*c*. In FIG. 2, the illustration of the terminal holding part 30 is omitted. The terminal holding part 30 is sandwiched by the left handle housing 4*a* and the right handle housing 4*b* and located at the battery pack mounting part 4*c*. The terminal holding part 30 has multiple terminals to be described afterwards. The terminals are connectible with the battery pack 20. The battery pack 20 for supplying power to the motor 7 can be mounted to the battery pack mounting part 4*c*, as shown in FIG. 1.

Figure 8:
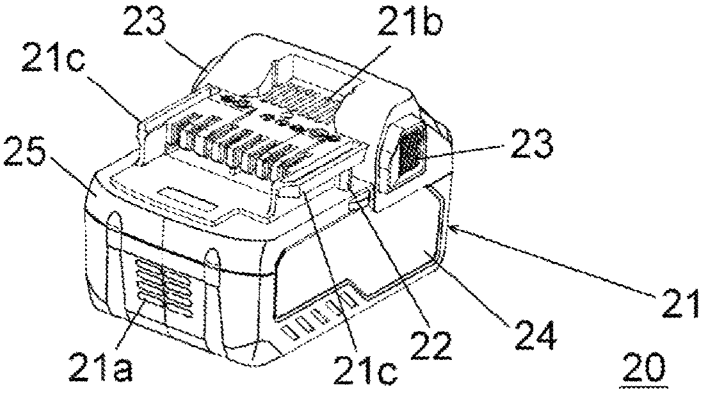
FIG. 8 is a perspective view of the battery pack 20.

The battery pack mounting part 4*c* is configured to move the battery pack 20 forward toward the battery pack mounting part 4*c* and mount the battery pack 20. The battery pack mounting part 4*c* has a pair of rail receiving parts 4*d* and latch concave parts 4*e* in the left and the right. The rail receiving parts 4*d* extend in parallel in the front-rear direction, are engaged with rail parts 21*c* of the battery pack 20 as shown in FIG. 8, and serve as guides when the battery pack 20 is moved (slides) forward toward the battery pack mounting part 4*c*. The latch concave part 4*e* is engaged with a latch convex part 22 of the battery pack 20 as shown in FIG. 8, and locks the battery pack 20 to the battery pack mounting part 4*c*. The controller 11 is held above the battery pack mounting part 4*c* in the handle housing 4. The controller 11 is sandwiched by the left handle housing 4*a* and the right handle housing 4*b*. The controller 11 is mounted with a microcontroller, and controls the driving of the motor 7 by controlling the inverter circuit.

Figure 6:
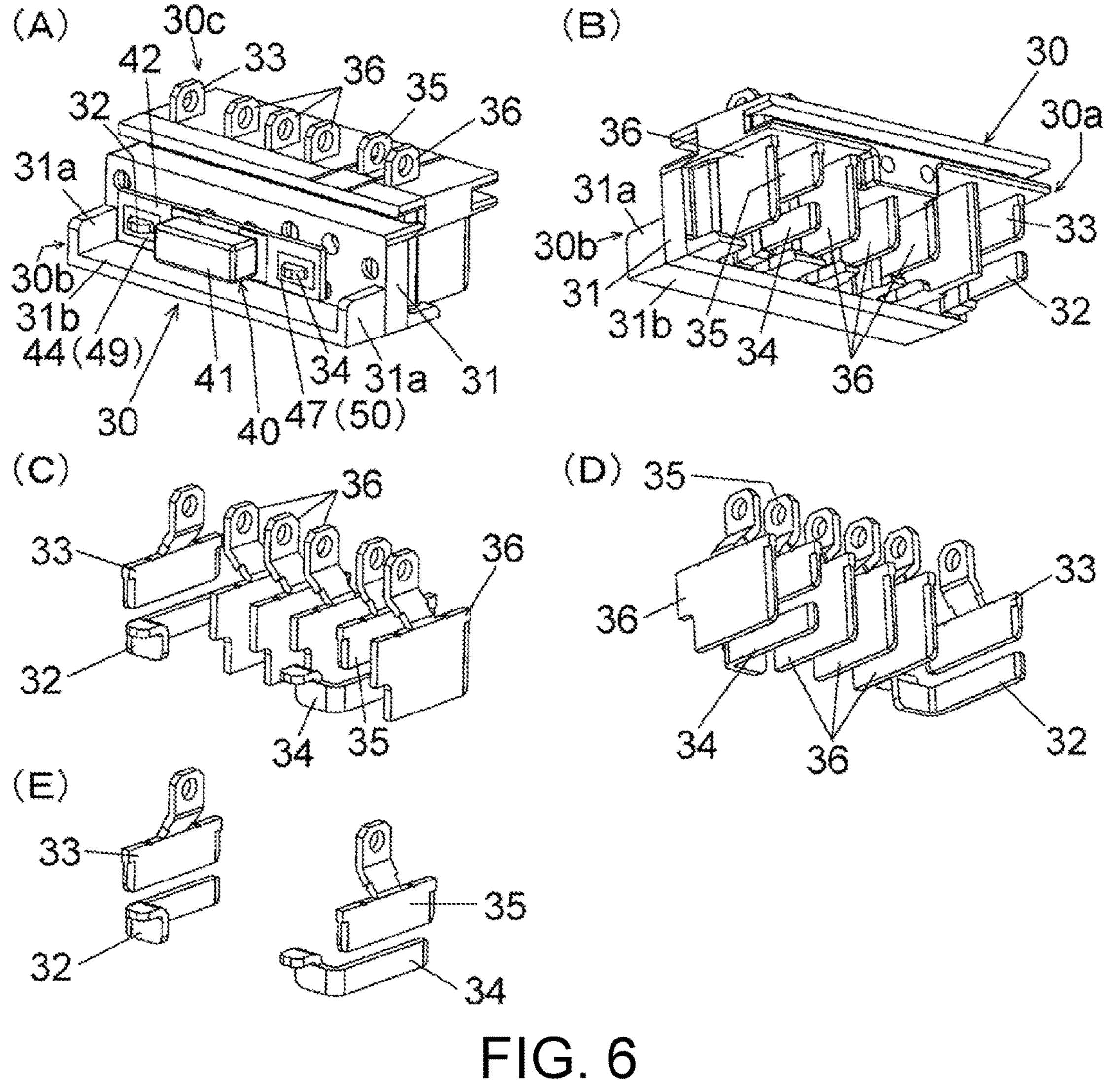
FIG. 6 is a view illustrating a terminal configuration of the electrical device 1.
Figure 7:
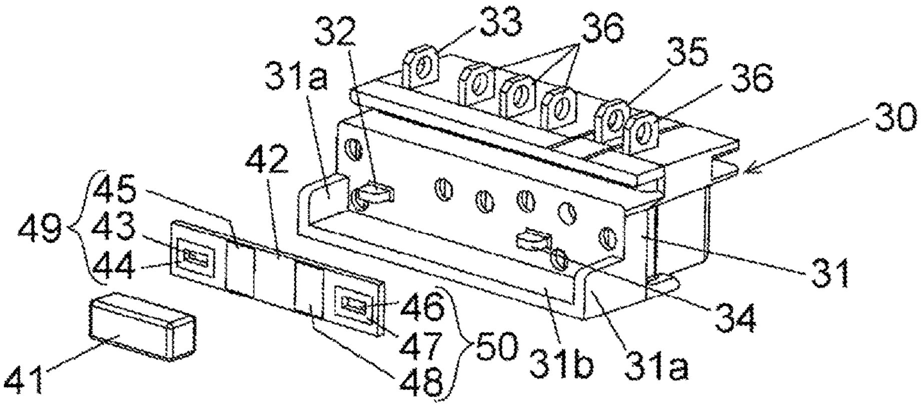
FIG. 7 is a perspective view illustrating the terminal holding part 30 and a fuse unit 40 in which the fuse unit 40 is arranged in an exploded state in (A) of FIG. 6.

The terminal configuration of the electrical device 1 and the configuration of the fuse unit 40 are described with reference to (A) to (E) of FIG. 6 and FIG. 7. (A) of FIG. 6 is a perspective view when the terminal holding part 30 and the fuse unit 40 assembled thereto are viewed from the front side. (B) of FIG. 6 is a perspective view when the terminal holding part 30 is viewed from the rear side. (C) and (D) of FIG. 6 are respectively perspective views in which only terminals are extracted from (A) and (B) of FIG. 6. (E) of FIG. 6 is a perspective view in which only the device-side first positive electrode terminal 32, the device-side second positive electrode terminal 33, the device-side first negative electrode terminal 34, and the device-side second negative electrode 35 are extracted from (C) of FIG. 6. FIG. 7 is a perspective view illustrating the terminal holding part 30 and the fuse unit 40, in which the fuse unit 40 is arranged in an exploded state in (A) of FIG. 6.

The terminal holding part 30 is a component in which the device-side first positive electrode terminal 32, the device-side second positive electrode terminal 33, the device-side first negative electrode terminal 34, the device-side second negative electrode terminal 35, and four device-side signal terminals 36 are held by using a holder 31 that is a resin molded body, for example. A mode of holding is, for example, insert molding (integral molding). The device-side first positive electrode terminal 32 and the device-side second positive electrode terminal 33 are located at the same position in the left-right direction and separated in the upper-lower direction. Similarly, the device-side first negative electrode terminal 34 and the device-side second negative electrode terminal 35 are located at the same position in the left-right direction and separated in the upper-lower direction. One end of each terminal faces rearward and protrudes rearward from the holder 31 in a front surface part 30*a* of the terminal holding part 30 opposite to the battery pack 20.

The other ends of the device-side second positive electrode terminal 33, the device-side second negative electrode terminal 35, and the device-side signal terminal 36 protrude upward from the upper surface part of the holder 31 in an upper surface part 30*c* of the terminal holding part 30 facing toward the top. The other ends of the device-side first positive electrode terminal 32 and the device-side first negative electrode terminal 34 protrude forward from the holder 31 in a back surface part 30*b* of the terminal holding part 30 facing forward. The terminal holding part 30 has side extension parts 31*a* and a lower extension part 31*b* protruding forward from the front surface (back surface) of the holder 31 in the back surface part 30*b*. The side extension parts 31*a* respectively extend forward from the left and right ends on the back surface of the holder 31. The lower extension part 31*b* extends forward from the lower end on the back surface of the holder 31.

The side extension parts 31*a* and the lower extension part 31*b* are connected with each other, thereby forming a U shape when viewed from the front, and covers the left, the bottom, and the right of the fuse unit 40. That is, the fuse unit 40 is disposed in a region covered by the side extension parts 31*a* and the lower extension part 31*b*. The rear of the fuse unit 40 is covered by the back surface part of the holder 31. The front and the top of the fuse unit 40 are covered by a partition part 4*f* of the handle housing 4 shown in FIG. 3. Such fuse unit 40 is covered by the holder 31 (the side extension parts 31*a* and the lower extension part 31*b*) and the partition wall part 4*f* in all directions. The partition wall part 4*f* is a portion of the outer wall of the handle housing 4 (the outer wall of the battery pack mounting part 4*c*). The fuse unit 40 is disposed between the outer surface of the holder 31 and the outer surface of the battery pack mounting part 4*c*. The fuse unit 40 is disposed on the outer side of the partition wall part 4*f*, that is, the outer part of the housing 3.

The fuse unit 40 is configured to be detachable with respect to the device-side first positive electrode terminal 32 and the device-side first negative electrode terminal 34. The fuse unit 40 includes a fuse 40 and a substrate 42. The substrate 42 includes a first conductor part 49, a second conductor part 50, a through hole 43 through which (with which) the device-side first positive electrode terminal 32 penetrates (is fit), and a through hole 46 through which (with which) the device-side first negative electrode terminal 34 penetrates (is fit). The first conductor part 49 includes a land 44 formed on the periphery of the through hole 43 and a land 45 connected with an end of the fuse 41. The second conductor part 50 includes a land 47 formed on the periphery of the through hole 46 and a land 48 connected with the other end of the fuse 41.

The device-side first positive electrode terminal 32 is connected, fixed to the land 44 by using a detachable fixing means, such as soldering. The device-side first negative electrode terminal 34 is connected, fixed to the land 47 by using a detachable fixing means, such as soldering. Accordingly, the substrate 42 is fixed to the back surface part 30*b* (the back surface of the holder 31). In the case where the substrate 42 is fixed to the back surface part 30*b* through the soldering of the device-side first positive electrode terminal 32 with respect to the land 44 and the soldering of the device-side first negative electrode terminal 34 with respect to the land 47, by applying heat of a predetermined amount or more to the soldered portion (engagement part), the fixing force is attenuated, and the substrate 42 can be removed from the back surface of the holder 31.

The first conductor part 49 and the second conductor part 50 form a portion of the substrate 42. An end of the first conductor part 49 is the land 45, and the other end is the land 44. An end of the second conductor part 50 is the land 48, and the other end is the land 47. Since the substrate 42 can be removed from the back surface part 30*b* as described above, the first conductor part 49 is detachable with respect to the device-side first positive electrode terminal 32, and the second conductor part 50 is detachable with respect to the device-side first negative electrode terminal 34.

The fuse 41 is connected between the device-side first positive electrode terminal 32 and the device-side first negative electrode terminal 34. An end of the fuse 41 is connected to the land 45 by soldering, etc. The other end of the fuse 41 is connected to the land 48 by soldering, etc. Accordingly, the fuse 41 is held on the substrate 42. The fuse 41 is formed by a fuse chip whose surface is covered by an insulating material. The fuse 41 is located in a region within the dimension range of the holder 31 in each of the front-back, up-down, and left-right directions. In the upper-lower direction, the fuse 41 is disposed at a position overlapped with the device-side first positive electrode terminal 32, the device-side second positive electrode terminal 33, the device-side first negative electrode terminal 34, and the device-side second negative electrode terminal 35 (an input terminal group into which power is input from the battery pack 20). In other words, the terminals (input terminal group) located on the front surface part 30*a* and the fuse 41 are in a position relationship of being at least partially overlapped in the upper-lower direction.

Figure 9:
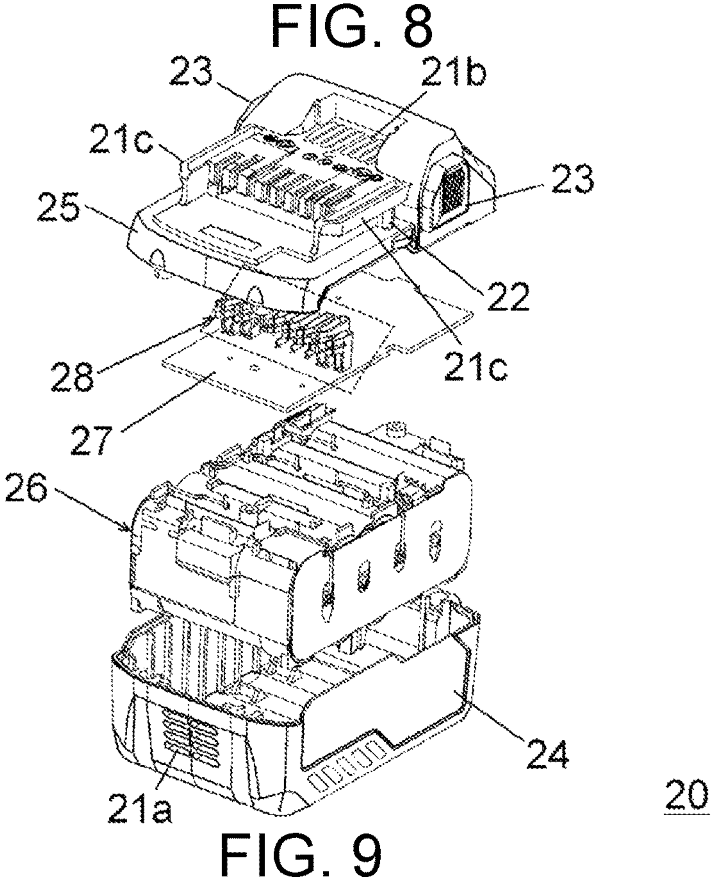
FIG. 9 is an exploded perspective view of the battery pack 20.

As shown in FIGS. 8 and 9, the battery pack 20, for example, has a case 21 formed by a resin molded body. The case 21 has ventilating windows 21*a*, 21*b* for cooling at the time of charging. The case 21 is a component integrated by assembling a lower case 24 and an upper case 25 to each other through screwing, etc. The case 21 has the rail parts 21*c* at the left and the right of the upper end. The latch convex parts 22 are provided at the lower parts of the front parts of the rail parts 21*c*. The rail parts 21*c* and the latch convex parts 22 are engaged with the rail receiving parts 4*d* and the latch concave parts 4*e* of the battery pack mounting part 4*c*. A latch operation part 23 is an operation part for removing the engagement between the latch convex parts 22 and the latch concave parts 4*e*.

Figure 10:
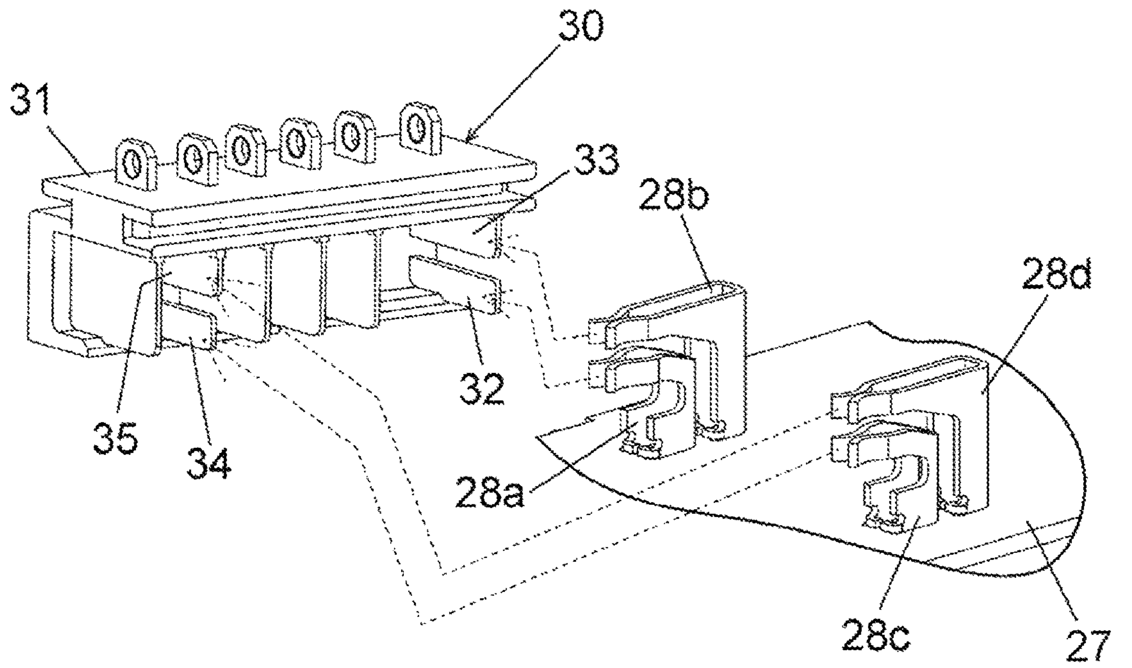
FIG. 10 is a schematic view illustrating a connection relationship between a device-side first positive electrode terminal 32, a device-side second positive electrode terminal 33, a device-side first negative electrode terminal 34, and a device-side second negative electrode terminal 35 of the terminal holding part 30 and a battery-side first positive electrode terminal 28*a*, a battery-side second positive electrode terminal 28*b*, a battery-side first negative electrode terminal 28*c*, and a battery-side second negative electrode terminal 28*d* of the battery pack 20.
Figure 11:
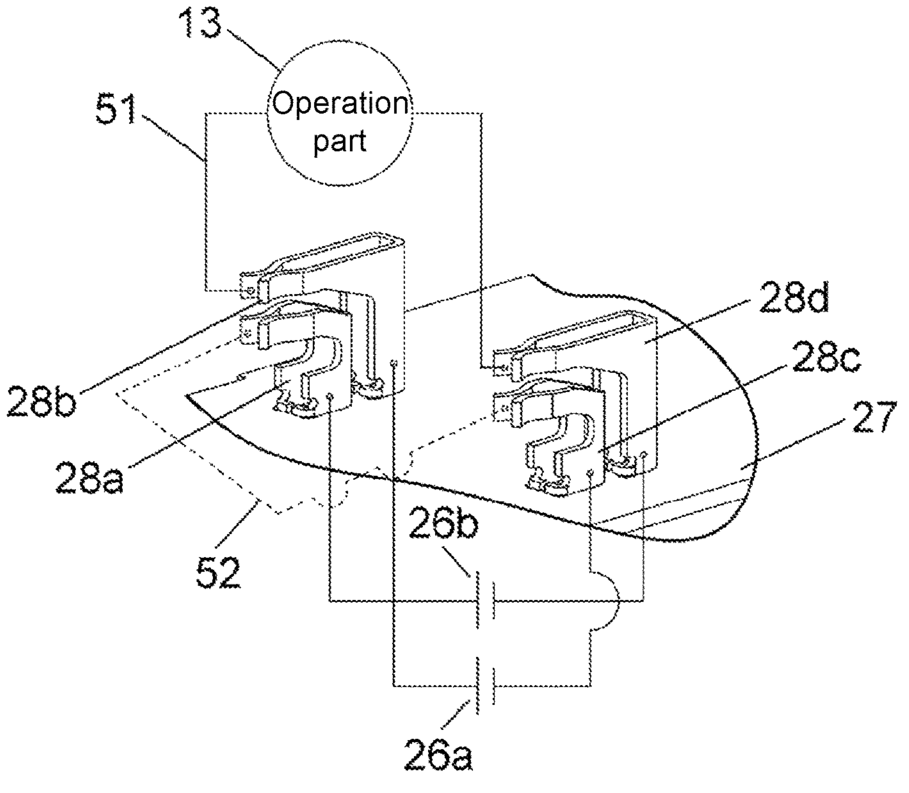
FIG. 11 is a schematic view illustrating a connection relationship between a first cell unit 26*a* and a second cell unit 26*b* of the battery pack 20 and the battery-side first positive electrode terminal 28*a*, the battery-side second positive electrode terminal 28*b*, the battery-side first negative electrode terminal 28*c*, and the battery-side second negative electrode terminal 28*d*.
Figure 12:
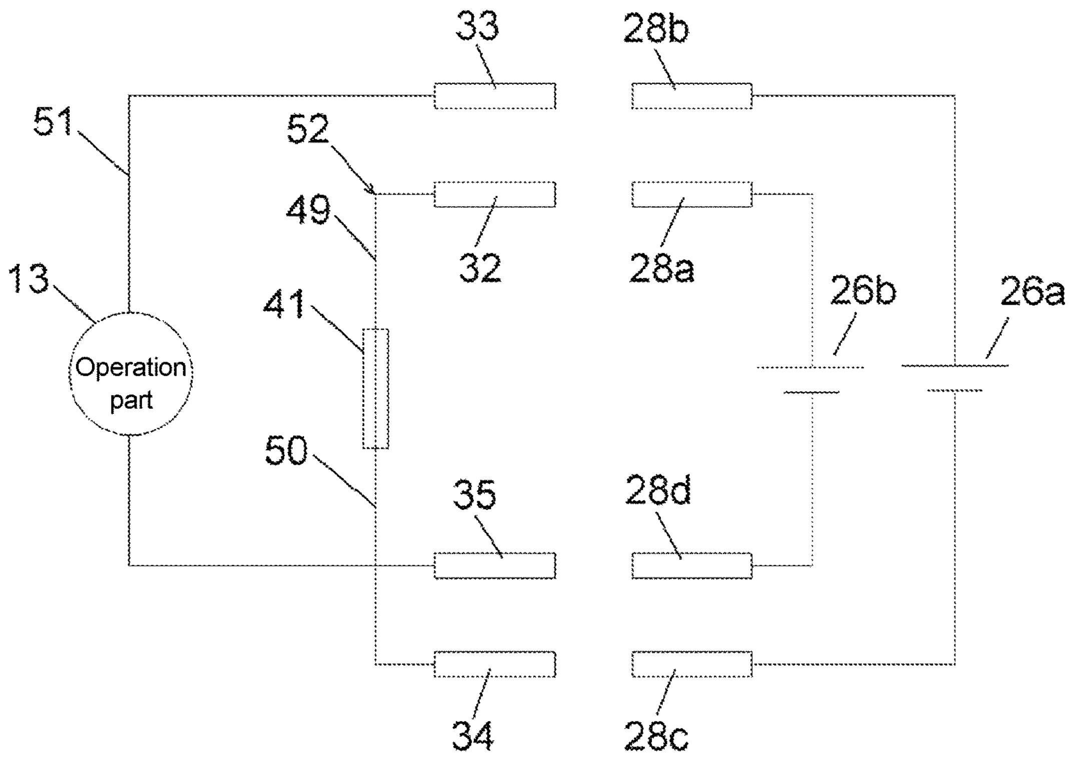
FIG. 12 is a schematic circuit diagram illustrating a power supply path from the first cell unit 26*a* and the second cell unit 26*b* to a driving part 7.

A cell unit 26 and a substrate 27 are accommodated in the case 21. The cell unit 26 includes two cell units (a first cell unit 26*a* and a second cell unit 26*b* to be described afterwards with reference to FIG. 11), in each of which five secondary battery cells are connected in series. In the substrate 27, a terminal group 28 connected with the respective terminals of the terminal holding part 30 is mounted. The terminal group 28 faces forward on the upper surface part of the case 21. As shown in FIGS. 10 and 11, the terminal group 28 includes the battery-side first positive electrode terminal 28*a*, the battery-side second positive electrode terminal 28*b*, the battery-side first negative electrode terminal 28*c*, and the battery-side second negative electrode terminal 28*d*, and includes multiple battery-side signal terminals not shown in FIGS. 10 and 11. The battery-side signal terminal is connected with the device-side signal terminal 36. The battery-side first positive electrode terminal 28*a* and the battery-side second positive electrode terminal 28*b* are located at the same position in the left-right direction and separated in the upper-lower direction. Similarly, the battery-side first negative electrode terminal 28*c* and the battery-side second negative electrode terminal 28*d* are located at the same position in the left-right direction and separated in the upper-lower direction.

As shown in FIG. 10, the battery-side first positive electrode terminal 28*a* is connected with the device-side first positive electrode terminal 32. The battery-side second positive electrode terminal 28*b* is connected with the device-side second positive electrode terminal 33. The battery-side first negative electrode terminal 28*c* is connected with the device-side first negative electrode terminal 34. The battery-side second negative electrode terminal 28*d* is connected with the device-side second negative electrode terminal 35. As described above, the device-side first positive electrode terminal 32 and the device-side first negative electrode terminal 34 are connected with each other via the fuse unit 40. The device-side second positive electrode terminal 33 and the device-side second negative electrode terminal 35 are connected with an operation part (driving part) 13. The driving part 13 is a component assembling the motor 7 and the inverter circuit supplying a current to the motor 7. It may also be that only the motor 7 serves as the operation part.

The device-side first positive electrode terminal 32 and the device-side first negative electrode terminal 34 function as a portion of the power supply path for supplying power from the battery pack 20 to the operation part 13 in the case in which the battery pack 20 is mounted to the battery pack mounting part 4*c*. The power supply path between the device-side second positive electrode terminal 33 and the device-side second negative electrode terminal 35, that is, a first power supply path 51 passing through the operation part 13 shown in FIGS. 11 and 12 forms a portion of the power supply path for supplying power from the battery pack 20 to the operation part 13 in the case in which the battery pack 20 is mounted to the battery pack mounting part 4*c*. The power supply path between the device-side first positive electrode terminal 32 and the device-side first negative electrode terminal 34, that is, a second power supply path 52 shown in FIGS. 11 and 12 forms a portion of the power supply path for supplying power from the battery pack 20 to the operation part 13 in the case in which the battery pack 20 is mounted to the battery pack mounting part 4*c*.

With the above terminal configuration of the terminal holding part 30, the first power supply path 51 and the second power supply path 52 are in a disconnected state in which the first power supply path 51 and the second power supply path 52 are not connected with each other when the battery pack 20 is not mounted to the battery pack mounting part 4*c*, and are in a serially connected state in which the first power supply path 51 and the second power supply path 52 are connected in series with each other when the battery pack 20 is mounted to the battery pack mounting part 4*c*. In the second power supply path 52, the first cell unit 26*a* and the second cell unit 26*b* are connected in series with each other. In the case of 3.6V per cell, the first cell unit 26*a* and the second cell unit 26*b* each have a voltage of 18V, and a voltage of 36V is present between the battery-side second positive electrode terminal 28*b* and the battery-side second negative electrode terminal 28*d*. The fuse unit 40 is provided on the second power supply path 52. When a large current flows through, the fuse 41 is blown and cuts off the second power supply path 52, that is, the fuse 41 stops the operation of the operation part 13. The fuse 41 serves as a control member for controlling the operation of the operation part 13.

Figure 13:
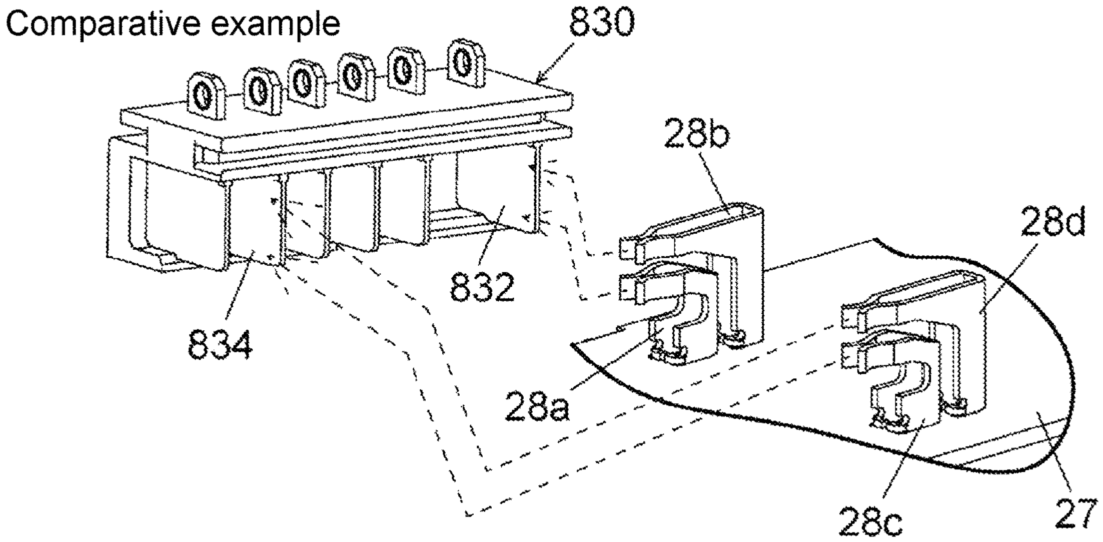
FIG. 13 is a schematic view illustrating, for a comparative example, a connection relationship between a device-side positive electrode terminal 832 and a device-side negative electrode terminal 834 of a terminal holding part 830 and the battery-side first positive electrode terminal 28*a*, the battery-side second positive electrode terminal 28*b*, the battery-side first negative electrode terminal 28*c*, and the battery-side second negative electrode terminal 28*d* of the battery pack 20 in a configuration in which 18V is output from the battery pack 20.

FIG. 13 is a schematic view illustrating, for a comparative example, a connection relationship between a device-side positive electrode terminal 832 and a device-side negative electrode terminal 834 of a terminal holding part 830 and the battery-side first positive electrode terminal 28*a*, the battery-side second positive electrode terminal 28*b*, the battery-side first negative electrode terminal 28*c*, and the battery-side second negative electrode terminal 28*d* of the battery pack 20 in a configuration in which 18V is output from the battery pack 20. The device-side positive electrode terminal 832 short-circuits between the battery-side first positive electrode terminal 28*a* and the battery-side second positive electrode terminal 28*b*. The device-side negative electrode terminal 834 short-circuits between the battery-side first negative electrode terminal 28*a* and the battery-side second negative electrode terminal 28*b*. Accordingly, the first cell unit 26*a* and the second cell unit 26*b* are connected in parallel with each other, and a voltage of 18V is output from the battery pack 20.

According to the embodiment, the following effects can be achieved.

(1) It is possible to suppress a large current from flowing in the configuration of the motor 7 or the cell unit 26, etc., by using the fuse 41. In addition, since the fuse unit 40 is detachable, in the case where the fuse 41 is blown, the electrical device 1 can be used again by removing the fuse unit 40 from the terminal holding part 30 and mounting a new fuse unit 40 to the terminal holding part 30. Accordingly, the maintenance of the electrical device 1 can be easy. In addition, since the fuse 41 can cut off the current regardless of the control of the controller 11, an issue can be coped with even in the case where the operation of the controller 11 is not in a normal state.

(2) Since the fuse unit 40 is provided on the second power supply path 52 different from the first power supply path 51 connected with the battery-side second positive electrode terminal 28*b* and the battery-side second negative electrode terminal 28*d* of the battery pack 20, compared with the case where the fuse unit 40 is provided on the first power supply path 51, the configuration of the first power supply path 51 can be compact. Since the second power supply path 52 is not a main line passing through the operation part 13, the maintenance is easy.

(3) The device-side first positive electrode terminal 32 is connected with the land 44 through soldering, etc., in the state of being fit with the through hole 43, and the device-side first negative electrode terminal 34 is connected with the land 47 through soldering, etc., in the state of being fit with the through hole 46. With such fitting connection, compared with a configuration of being connected through soldering only, a configuration that is strong against impacts such as vibrations and is replaced easily can be formed.

(4) Since the fuse unit 40 is disposed by using the space at the front (back surface side) of the back surface part 30*b* of the terminal holding part 30, the electrical device 1 can be compact. In addition, the wiring (the first conductor part 49 and the second conductor part 50) to the fuse 41 can be reduced. Since the rear of the back surface part 30*b* is used as a space for moving and mounting the battery pack 20, by using the front region as the arrangement space of the fuse 41, a configuration that hardly affects battery mounting can be formed.

(5) Since the fuse 41 is disposed to be overlapped with the device-side first positive electrode terminal 32, the device-side second positive electrode terminal 33, the device-side first negative electrode terminal 34, and the device-side second negative electrode terminal 35, a compact configuration can be realized. Although the fuse 41 has an increased size as the dust resistance is enhanced by insulating coating, compactness can still be maintained by disposing the fuse 41 to the side of the back surface part of the holder 31.

(6) The fuse unit 40 is a in a fixed unit configuration holding the fuse 41, the first conductor part 49, and the second conductor part 50 on the substrate 42, so the fuse unit 40 can be assembled and removed easily.

(7) Since the fuse unit 40 is disposed outside the housing 3, the fuse unit 40 does not squeeze the accommodation space inside the housing 3, and the size of the body can be suppressed from increasing. In addition, since the fuse unit 40 is disposed outside, it is possible to adopt a configuration in which the fuse unit 40 can be visually checked and operated without disassembling the housing 3, etc., and it is possible to facilitate the maintenance properties. Although it is intended to protect the fuse unit 40 by using the side extension parts 31*a*, the lower extension part 31*b*, and the partition wall part 4*f* to be described afterwards in the embodiment, if the maintenance properties are to be emphasized, a configuration in which the side extension parts 31*a* and the lower extension part 31*b* are removed, and the battery pack 20 is removed, so that the fuse 41 is exposed to be accessible is also possible. In such case, since the fuse 41 cannot be operated unless the battery pack 20 is removed, it is also favorable in terms of maintenance. It is noted that such effect is not limited to the fuse unit 40 only, but is also applicable to various electrical components that can be disposed outside the housing 3. For example, such effect is also applicable to a capacitor or an electronic component against noise. When such element is added to a conventional electrical device, the case where there is no flexibility in the internal containing space (accommodation space) of a housing, etc., can be coped with. Accordingly, it is easy to add an electrical component (electrical element) without changing the shape of the housing.

(8) Since the fuse unit 40 is covered by the holder 31 (the side extension parts 31*a* and the lower extension part 31*b*) and the partition wall part 4*f* in all directions, the fuse 41 is protected from contacting another component or the outside as well as dust, and the heat of the fuse 41 can be suppressed from being transmitted to the battery pack 20 and the controller 11. Such effect is not limited to the fuse unit 40. Even in the case where another electrical component is disposed outside the housing, the electrical component can be protected in such configuration.

(9) The fuse unit 40 is provided on the second power supply path 52. Therefore, two cell units can be protected by using one fuse.

Figure 14:
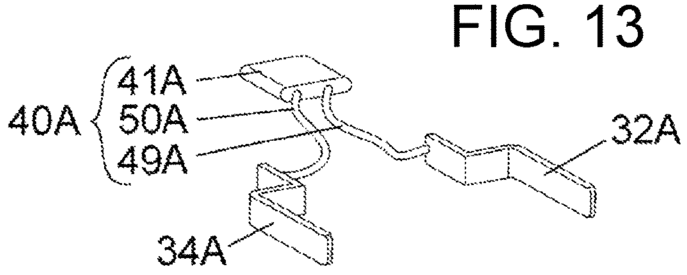
FIG. 14 is a perspective view illustrating a fuse unit 40A as well as a device-side first positive electrode terminal 32A and a device-side first negative electrode terminal 34A connected with the fuse unit 40A according to Embodiment 2 of the invention.

(Embodiment 2) FIG. 14 is a perspective view illustrating a fuse unit 40A as well as a device-side first positive electrode terminal 32A and a device-side first negative electrode terminal 34A connected with the fuse unit 40A according to Embodiment 2 of the invention. The fuse unit 40A has a fuse 41A, a first conductor part 49A, and a second conductor part 50A. An end of the first conductor part 49A is connected with an end of the fuse 41A. The other end of the first conductor part 49A is connected with the device-side first positive electrode terminal 32A through soldering, etc. An end of the second conductor part 50A is connected with the other end of the fuse 41A. The other end of the second conductor part 50A is connected with the device-side first negative electrode terminal 34A through soldering, etc.

Figure 15:
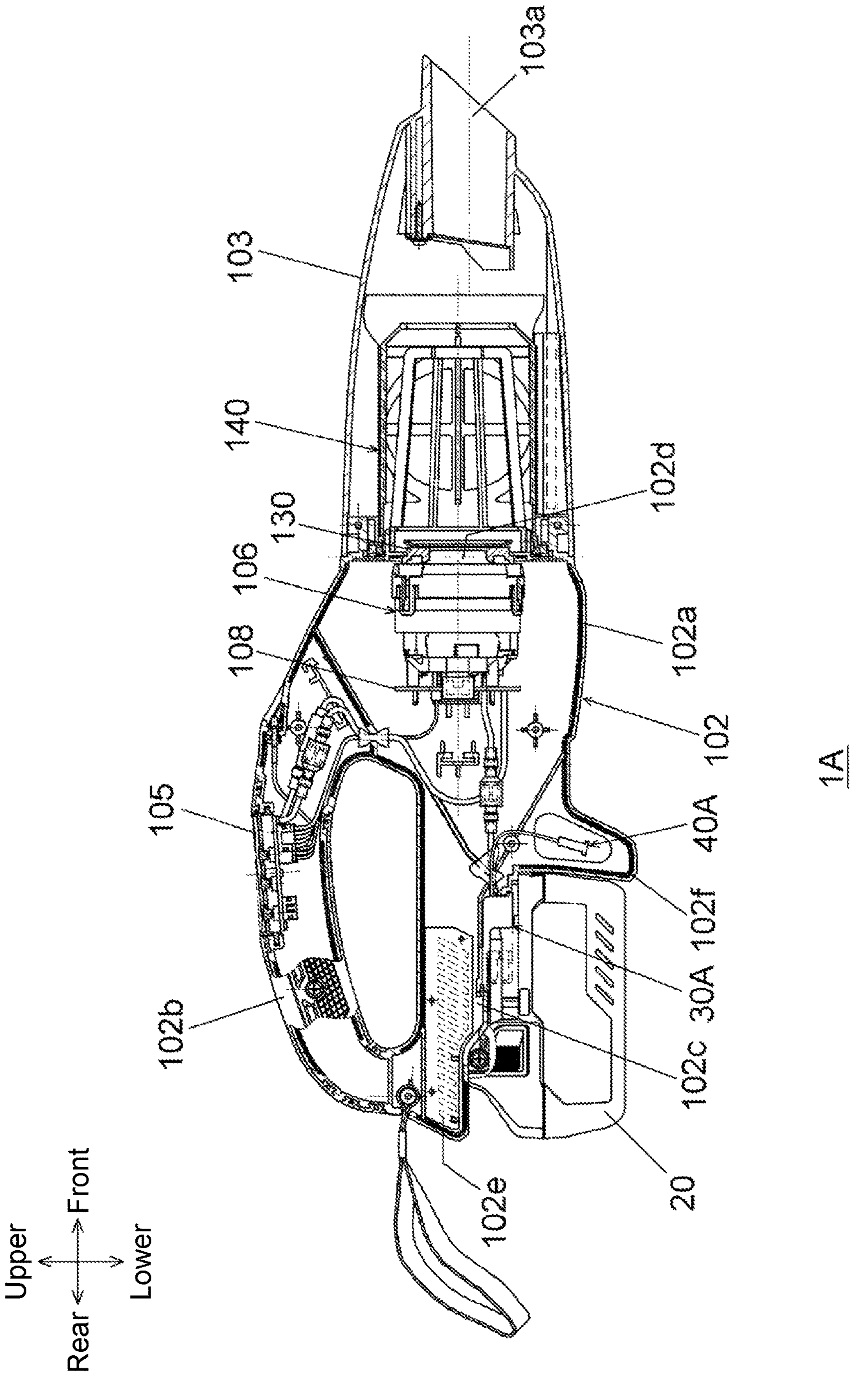
FIG. 15 is a cross-sectional side view illustrating an electrical device 1A according to Embodiment 2 of the invention.

FIG. 15 is a cross-sectional side view illustrating an electrical device 1A according to Embodiment 2 of the invention. The electrical device 1A is a cordless electrical tool, specifically a portable cleaner (vacuum cleaner). As shown in FIG. 15, the respective directions. i.e., the front-rear and upper-lower directions orthogonal to each other in the electrical device 1A are defined. In addition, a direction perpendicular to the front-rear and upper-lower directions is defined as the left-right direction. The front-rear direction is a slide direction when the battery pack 20 is mounted/detached with respect to the electrical device 1A.

The outer shell of the electrical device 1A is formed by a body housing 102 and a dust case 103. The body housing 102 and the dust case 103, for example, are both resin molded bodies. The dust case 103 is detachably connected and fixed to the rear of the body housing 102. A dust case intake port 103*a* is provided at the front end of the dust case 103. An extension pipe or a flexible hose not shown herein can be attached to the dust case intake port 103*a*.

A filter device 140 is provided inside the dust case 103. The filter device 140 covers a body intake port 102*d* open to the front end of the body housing 102. A front end of a fan motor unit 106 and a seal member 130 extend in the body intake port 102*d*. The body intake port 102*d* is in communication with a space in the dust case 103. An exhaust port is provided at each of the left and right surfaces of the rear end of the body housing 102. The body housing 102 has an accommodation part 102*a*, a handle part 102*b*, a battery pack mounting part 102*c*, and a cover part 102*f*.

The accommodation part 102*a* is a portion at the front part of the body housing 102. The accommodation part 102*a* accommodates the fan motor unit 106, etc. The handle part 102*b* is a portion extending rearward from the upper end of the accommodation part 102*a*. The operator grips the handle part 102*b* to handle the electrical device 1A. On the upper surface of the handle part 102*b*, an operation panel (switch part) 105 is provided. With various switches provided on the operation panel 105, it is possible to switch to start or stop the electrical device 1A, or switch the air volume of the electrical device 1A.

The battery pack mounting part 102*c* is a portion at the rear lower part of the body housing 102. At the battery pack mounting part 102*c*, the battery pack 20 as the power source of the electrical device 1A is mounted detachably. The terminal holding part 30A is provided at the battery pack mounting part 102*c*. The terminal holding part 30A is sandwiched by the left part and the right part of the body housing 102 in a left-right split configuration, and is located at the battery pack mounting part 102*c*. Although the detailed illustration is omitted, in the terminal holding part 30A, the device-side first positive electrode terminal 32 of the terminal holding part 30 of Embodiment 1 is replaced with the device-side first positive electrode terminal 32A shown in FIG. 14, the device-side first negative electrode terminal 34 of the terminal holding part 30 is replaced with the device-side first negative electrode terminal 34A shown in FIG. 14, and the side extension parts 31*a* and the lower extension part 31*b* of the terminal holding part 30 are not formed.

The cover part 102*f* covers and protects the ventilating window 21*a* (FIG. 8) of the front surface of the battery pack 20 mounted to the battery pack mounting part 102*c*. As shown in FIG. 14, the fuse unit 40 connected with the device-side first positive electrode terminal 32A and the device-side first negative electrode terminal 23A extends in the space on the inner side of the cover part 102*f* shown in FIG. 15. Accordingly, dead space can be utilized effectively.

The fan motor unit 106 is a unit integrally provided with a motor, a fan integrally rotating with the motor, and a control substrate 108. The fan motor unit 106 operates by using power supplied from the battery pack 20. The motor is a brushless motor. The fan is a centrifugal fan and generates an air flow for dust collection. The control substrate 108 functions as a control part controlling the driving of the motor 7. The seal member 130 is an annular elastic body such as rubber formed in an annular shape, and seals (air-tightly blocks) the body housing 102 and the fan motor unit 106.

When the operator operates the switch of the operation panel 105 to drive the fan motor unit 106, the fan motor unit 106 is driven. The air flow so generated is taken into the dust case 103 from the dust case intake port 103*a*. The air flow passes through the filter device 140 and is taken into the fan motor unit 106 through the body intake port 102*d*. The air flow is exhausted to the rear from the inside of the fan motor unit 106. The air flow is eventually exhausted from an exhaust port 102*e* to the outside of the body housing 102. The dust entering together with the air flow from the dust case intake port 103*a* is captured by the filter device 140 and accumulated inside the dust case 103 and the outer side of the filter device 140.

According to the embodiment, with the fuse unit 40A extending in the internal space of the cover part 102*f*, which is a surplus space, the squeezing of the fuse unit 40 to the internal space of the body housing 102 can be suppressed, and the electrical device 1A can be compact.

Figure 16:
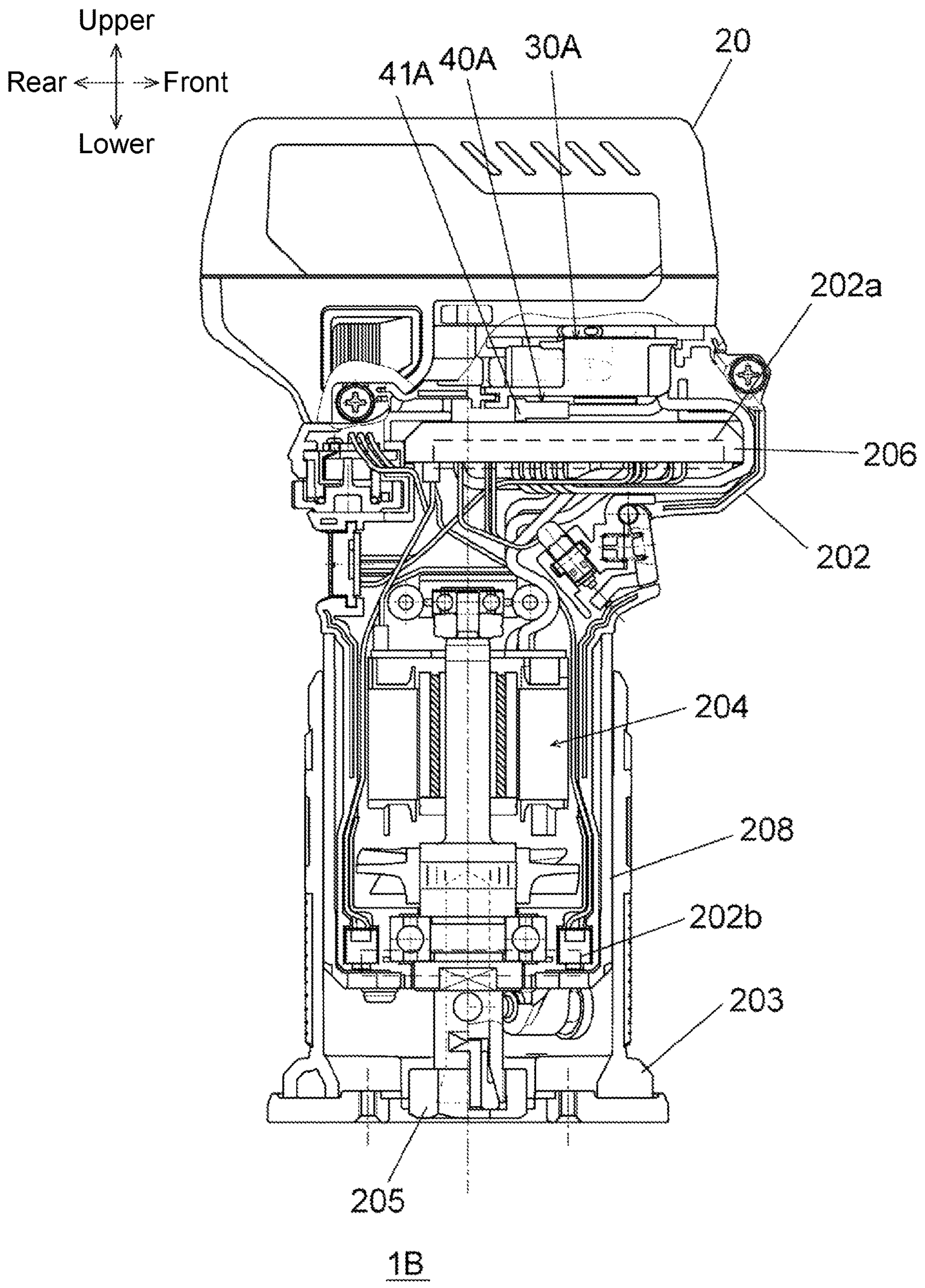
FIG. 16 is a cross-sectional side view illustrating an electrical device 1B according to Embodiment 3 of the invention.

(Embodiment 3) FIG. 16 is a cross-sectional side view illustrating an electrical device 1B according to Embodiment 3 of the invention. The electrical device 1B is a cordless electrical tool, specifically a trimmer. As shown in FIG. 16, the respective directions, i.e., the front-rear and upper-lower directions orthogonal to each other in the electrical device 1B are defined. In addition, a direction perpendicular to the front-rear and upper-lower directions is defined as the left-right direction. The front-rear direction is a slide direction when the battery pack 20 is mounted/detached with respect to the electrical device 1B.

The outer shell of the electrical device 1B is formed by a housing 202 and a base 203. The housing 202 is a resin molded body, for example. The base 203 is a resin molded body, for example. The base 203, for example, is provided on the outer circumference of the lower part of the housing 202 to surround a cylindrical case 208 made of metal, for example, and is movable with respect to the housing 202 in the upper-lower direction. With the movement of the base 203 with respect to the housing 202 in the upper-lower direction, the protrusion amount of a tip tool (not shown) from the lower surface of the base 203 can be adjusted. The tip tool is held by a chuck 205, and is rotatably driven by a motor 204.

The motor 204 is accommodated inside the housing 202. The upper end of the housing 202 is a battery pack mounting part. The battery pack 20 can be detachably mounted to the battery pack mounting part. A controller 206 is provided inside the battery pack mounting part. The controller 206 is made of metal and open to the lower part. The terminal holding part 30A is provided at the battery pack mounting part. The terminal holding part 30A is sandwiched by the left part and the right part of the housing 202 in a left-right split configuration, and is located at the battery pack mounting part. The terminal holding part 30A is located above the controller 206. The fuse unit 40A connected with the terminal holding part 30A extends between the terminal holding part 30A and the controller 206 in the housing 202.

The housing 202 has an intake port 202*a* and an exhaust port 202*b*. The fuse unit 40A is not provided at a region which connects the intake port 202*a* and the exhaust port 202*b*, that is, not provided on a wind path. Accordingly, the fuse unit 40A exhibits favorable dust resistance. In addition, in the embodiment, the outer shell of the controller 206 on the side of the fuse unit 40A is made of metal, and the thermal resistance is secured.

Figure 17:
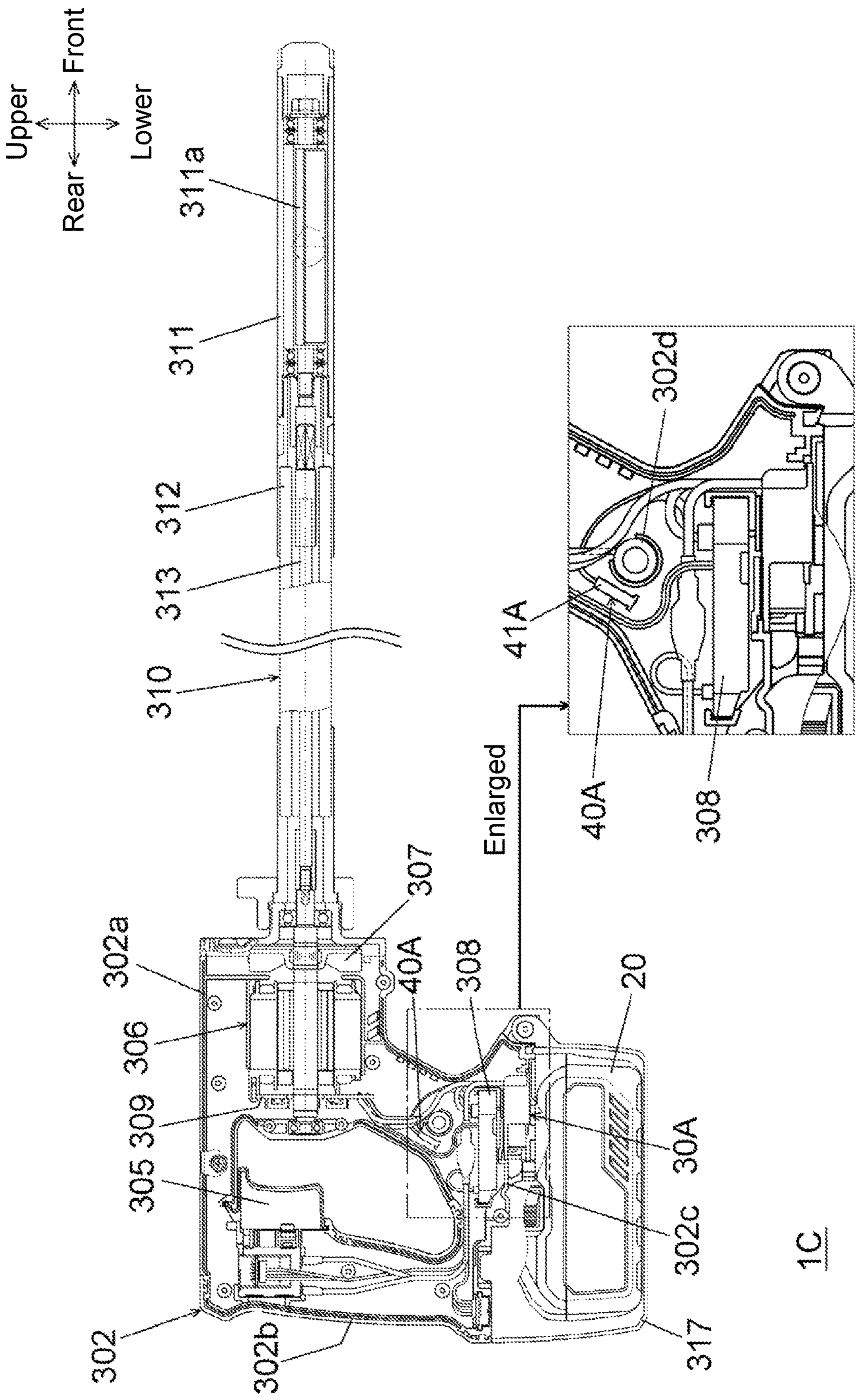
FIG. 17 is a cross-sectional side view illustrating an electrical device 1C according to Embodiment 4 of the invention.

(Embodiment 4) FIG. 17 is a cross-sectional side view illustrating an electrical device 1C according to Embodiment 4 of the invention. The electrical device 1C is a cordless electrical tool, specifically a concrete vibrator. As shown in FIG. 17, the respective directions, i.e., the front-rear and upper-lower directions orthogonal to each other in the electrical device 1C are defined. In addition, a direction perpendicular to the front-rear and upper-lower directions is defined as the left-right direction. The front-rear direction is a slide direction when the battery pack 20 is mounted/detached with respect to the electrical device 1C.

The outer shell of the body of the electrical device 1C is formed by a housing 302. The housing 302 is a resin molded body of a left-right two-split structure, for example. The housing 302 includes a motor accommodation part 302*a*, a holding part (handle part) 302*b*, and a battery pack mounting part 302*c*. The housing 302 is in a substantially D shape. The other end (lower end) of the holding part 302*b* is connected with the battery pack mounting part 302*c*.

The motor accommodation part 302*a* accommodates a motor (electrical motor) 306. A trigger switch 305 is provided at the holding part 302*b*. By using the trigger switch 305, the operator can instruct to drive or stop the motor 306. A control substrate 308 is provided inside the battery pack mounting part 302*c*. The battery pack 20 serving as the driving source (power source) of the motor 306 is detachably mounted (slide connection) to the battery pack 20. The battery pack 20 may be detachable to the electrical tool. The lower surface of the battery pack mounting part 302*c* and the battery pack 20 mounted to the battery pack mounting part 302*c* are covered by a cover 317 that can be opened and closed.

The terminal holding part 30A is provided at the battery pack mounting part 302*c*. The terminal holding part 30A is sandwiched by the left part and the right part of the housing 302 in a left-right split configuration, and is located at the battery pack mounting part 302*c*. The fuse 41A of the fuse unit 40A connected with the terminal holding part 30A is located between a screw boss 302*d* and the inner surface of the housing 302 in the housing 302. Accordingly, at the screw boss 302*d* and inner surface of the housing 302, the fuse 41A can be easily positioned without using a separate fixing member. The screw boss 302*d* is used to screw the left part and the right part of the housing 302.

The motor 306 is an inner rotor type brushless motor. A switching element substrate 309 is provided behind the motor 306. In the switching element substrate 309, a switching element of the inverter circuit supplying the driving current to the motor 306 is mounted. A fan 307 integrally rotating with the motor 306 is provided ahead of the motor 306. The fan 307 generates cooling air for cooling the motor 306.

A tip tool 310 extends forward from the front end of the housing 302. The tip tool 310 includes a vibration part 311, a flexible hose 312, and a flexible shaft 313. The flexible shaft 313 is directly connected to the motor 306 and integrally rotates with the motor 306. The flexible hose 312 covers the periphery of the flexible shaft 313. The vibration part 311 is connected to the front end of the flexible hose 312. An eccentric weight 311 is provided inside the vibration part 311. The eccentric weight 311*a* is rotationally driven by the motor 306 via the flexible shaft 313. The gravity center of the eccentric weight 311*a* is eccentric with respect to the central axis of the vibration part 311. The vibration part 311 vibrates through the rotation of the eccentric weight 311*a*. That is, the vibration part 311 vibrates by using the motor 306. The operator inserts the vibration part 311 that vibrates into fresh concrete and performs a driving operation and a fastening operation.

According to the embodiment, by disposing the fuse 41A between the screw boss 302*d* used to screw the left part and the right part of the housing 302 and the inner surface of the housing 302, the fuse 41A can be easily positioned by using the screw boss 302*d* and the inner surface of the housing 302. Therefore, a separate component for fixing the fuse 41A is not required, and the number of parts can be suppressed from increasing.

Although the invention has been described above with reference to the embodiments, it should be understood by those skilled in the art that various modifications can be made to each component and each processing process of the embodiments within the scope of the claims. Modified examples will be discussed below.

The electrical device of the invention is not limited to an electrical tool, but may also be a device without a motor, such as a light having an illumination device as the operation part or a radio having an acoustic device as the operation part. In the connection between the first conductor part 49A and the device-side first positive electrode terminal 32A and the connection between the second conductor part 50A and the device-side first negative electrode terminal 34A, a crimp terminal may be used. Various numerical values such as the number of battery cells in each of the first cell unit 26*a* and the second cell unit 26*b* or the number of device-side signal terminals 36 are not limited to the values specifically indicated in the embodiments and may be arbitrary.

What is claimed is:

1. An electrical device, comprising:

an operation part, operated by electrical power;

a body part, accommodating the operation part;

a battery pack mounting part, connected with the body part and being able to mount a battery pack for supplying electrical power to the operation part;

a terminal holding part, provided at the battery pack mounting part and having a plurality of terminals connectible with the battery pack; and a fuse unit, attached to a first positive electrode terminal and a first negative electrode terminal forming the terminals, and comprising: a fuse, connected between the first positive electrode terminal and the first negative electrode terminal; a first conductor part, one end of the first conductor part being connected to an end of the fuse and an other end of the first conductor part being connected to the first positive electrode terminal; and a second conductor part, one end of the second conductor part being connected to an other end of the fuse and an other end of the second conductor part being connected to the first negative electrode terminal, wherein in a state in which the battery pack is mounted to the battery pack mounting part, the first positive electrode terminal and the first negative electrode terminal serve as a portion of a power supply path for supplying the electrical power from the battery pack to the operation part, the power supply path has: a first power supply path connected with a positive electrode terminal and a negative electrode terminal of the battery pack; and a second power supply path different from the first power supply path, in a state in which the battery pack is not mounted to the battery pack mounting part, the first power supply path and the second power supply path are configured in a disconnected state in which the first power supply path and the second power supply path are not connected with each other, and in the state in which the battery pack is mounted to the battery pack mounting part, the first power supply path and the second power supply path are configured in a serially connected state in which the first power supply path and the second power supply path are connected in series with each other, and the fuse unit is provided on the second power supply path.

2. The electrical device as claimed in claim 1, wherein the other end of the first conductor part is connected in a state of being fit with the first positive electrode terminal, and the other end of the second conductor part is connected in a state of being fit with the first negative electrode terminal.

3. The electrical device as claimed in claim 1, wherein the battery pack is configured to be moved forward toward the battery pack mounting part to mount the battery pack to the battery pack mounting part, the terminal holding part has: a front surface part located at a rear part of the terminal holding part and being opposite to the battery pack; and a back surface part located on a side opposite to the front surface part, and the fuse unit is disposed on the back surface part of the terminal holding part.

4. The electrical device as claimed in claim 1, wherein the fuse is covered by an insulating material and at least a part of the fuse unit is covered by a part of the terminal holding part.

5. The electrical device as claimed in claim 1, wherein the terminal holding part has an input terminal group into which the electrical power is input from the battery pack, and the fuse is disposed at a position overlapped with the input terminal group in a width direction.

6. The electrical device as claimed in claim 1, wherein the fuse unit is disposed outside the body part and the battery pack mounting part.

7. The electrical device as claimed in claim 1, wherein the terminal holding part is further provided with a holder part made of resin and holding the terminals, an extension part extending in a predetermined direction from the holder part is provided in the holder part, and the fuse is disposed in a region covered by the extension part.

8. The electrical device as claimed in claim 1, wherein the battery pack has at least two cell units, and the second power supply path is configured to serially connect the two cell units with each other.

9. The electrical device as claimed in claim 1, wherein the other end of the first conductor part is fixed to the first positive electrode terminal by soldering and the other end of the second conductor part is fixed to the first negative electrode terminal by soldering.

10. An electrical device, comprising:
an operation part, operated by electrical power;
a body part, accommodating the operation part;
a battery pack mounting part, connected to the body part, the battery pack mounting part having a rail part extending in a front-rear direction and being configured to mount a battery pack for supplying electrical power to the operation part by moving the battery pack forward relative to the battery pack mounting part along the rail part;
a terminal holding part, provided at the battery pack mounting part;
a first terminal and a second terminal, held by the terminal holding part, each of the first terminal and the second terminal has a first end protruding rearward from the terminal holding part to connect with the battery pack and a second end protruding forward from the terminal holding part;
a fuse fixed to and electrically connected between the second end of the first terminal and the second end of the second terminal.

11. The electrical device as claimed in claim 10, wherein the fuse is connected with the second end of the first terminal through a first conductor part and is connected with the second end of the second terminal through a second conductor part, and
the first conductor part and the second conductor part are configured as portions of a substrate or wires.

12. The electrical device as claimed in claim 11, wherein a controller for controlling an operation of the operation part is accommodated in the body part, and
the fuse is disposed in a space between the terminal holding part and the controller inside the body part.

13. The electrical device as claimed in claim 10,
wherein a positive electrode terminal and a negative electrode terminal protrude upward from an upper surface of the terminal holding part,
the positive electrode terminal and the negative electrode terminal being electrically connected to the operation part and forming part of a power supply path from the battery pack to the operation part.

14. The electrical device as claimed in claim 13,
wherein the battery pack includes a first cell unit and a second cell unit,
when the battery pack is mounted to the battery pack mounting part, the first terminal and the second terminal being connected to the first cell unit, and the positive electrode terminal and the negative electrode terminal being connected to the second cell unit.

15. The electrical device as claimed in claim 14,
wherein, when the battery pack is mounted in the battery pack mounting part, the fuse is configured to connect the first cell unit and the second cell unit in series.

16. An electrical device, comprising:
an operation part, operated by electrical power;
a body part, accommodating the operation part;
a battery pack mounting part, connected with the body part and being able to mount a battery pack for supplying electrical power to the operation part;
a terminal holding part, provided at the battery pack mounting part and having a plurality of terminals connectible with the battery pack; and
a fuse unit, attached to a first positive electrode terminal and a first negative electrode terminal forming the terminals, and comprising: a fuse, connected between the first positive electrode terminal and the first negative electrode terminal; a first conductor part, one end of the first conductor part being connected to an end of the fuse and an other end of the first conductor part being connected to the first positive electrode terminal; and a second conductor part, one end of the second conductor part being connected to an other end of the fuse and an other end of the second conductor part being connected to the first negative electrode terminal,
wherein the battery pack is configured to be moved forward toward the battery pack mounting part to mount the battery pack to the battery pack mounting part,
the terminal holding part has: a front surface part located at a rear part of the terminal holding part and being opposite to the battery pack; and a back surface part located on a side opposite to the front surface part, and
the fuse unit is disposed on the back surface part of the terminal holding part,
wherein the fuse unit is further provided with a substrate holding the fuse, the first conductor part, and the second conductor part, and the substrate is fixed to the back surface part of the terminal holding part.

17. An electrical device, comprising:
an operation part, operated by electrical power;
a body part, accommodating the operation part;
a battery pack mounting part, connected with the body part and being able to mount a battery pack for supplying electrical power to the operation part;
a terminal holding part, provided at the battery pack mounting part and having a plurality of terminals connectible with the battery pack; and
a fuse unit, attached to a first positive electrode terminal and a first negative electrode terminal forming the terminals, and comprising: a fuse, connected between the first positive electrode terminal and the first negative electrode terminal; a first conductor part, one end of the first conductor part being connected to an end of the fuse and an other end of the first conductor part being connected to the first positive electrode terminal; and a second conductor part, one end of the second conductor part being connected to an other end of the fuse and an other end of the second conductor part being connected to the first negative electrode terminal,
wherein the terminal holding part is further provided with a second positive electrode terminal and a second negative electrode terminal,
in a state in which the battery pack is not mounted to the battery pack mounting part, the operation part is not disposed on a current path on which the first positive electrode terminal and the first negative electrode terminal are electrically connected, but disposed on a current path on which the second positive electrode terminal and the second negative electrode terminal are electrically connected.

* * * * *